Aug. 13, 1940.  A. MURRAY  2,211,345
HALFTONE SCREEN
Filed June 1, 1939   2 Sheets-Sheet 1

Inventor
Alexander Murray
By Newton M Perris
Attorney

Aug. 13, 1940.   A. MURRAY   2,211,345
HALFTONE SCREEN
Filed June 1, 1939   2 Sheets-Sheet 2

Inventor
Alexander Murray

Attorney

Patented Aug. 13, 1940

2,211,345

UNITED STATES PATENT OFFICE 2,211,345

HALFTONE SCREEN

Alexander Murray, Rochester, N. Y., assignor to Eastman Kodak Company, Rochester, N. Y., a corporation of New Jersey Application June 1, 1939, Serial No. 276,847

9 Claims. (Cl. 95—81)

This invention relates to photo-mechanical printing and particularly to the manufacture of halftone screens.

It is an object of the invention to produce halftone screens on photographic films or plates.

It is a particular object of the invention to produce high quality graded halftone screens which may be used as contact screens and which have graded density distribution over each element or dot thereof.

In certain processes involving integral halftone screens, a film or plate is first exposed to a halftone image, preferably through the base and is later exposed to the scene to be recorded. Upon development there results a halftone screen superimposed on the image. It is an object of the present invention to provide a method and means for placing this latent halftone image on the film.

More specifically, it is an object of the invention to make halftone screens or latent halftone images continuously on long rolls of film.

It is an object of one particular embodiment of the invention to provide a method and means for exposing film to a slightly distorted halftone image of predetermined distortion.

According to the invention, a sensitive photographic film or plate is exposed through a halftone screen (e. g. a geometrical screen of the ruled type). During the exposure the film or plate is moved in its own plane, i. e. parallel to the screen except in those cases where distortion is purposely introduced. Simultaneously, the light source in front of the screen is moved in the opposite direction to the film and at a speed such that the shadow of the screen always falls on the same area of the film. The relative speeds may be slightly different from this ideal case if distortion is desired.

In the regular embodiment of the invention, the area of the light source as seen by the film is such that its diameter divided by the distance to the film is equal to the width of dark lines of the screen divided by the distance of the screen to the film. The word "regular" is here used to include only those cases where no distortion has been purposely introduced. In this regular case, there is no umbra but only penumbra in the shadow of the screen which falls on the film. If the light source has a diameter smaller than this, there will be some portions of the film entirely unexposed; this may be desirable in some cases. If the light source is larger than the regular case, there will be an overlapping of the dot image which is, of course, undesirable since it introduces an overall fog in addition to the screen pattern.

The distribution of density over each dot formed on the film depends on the shape of the screen openings and the shape of the light source as seen by the film. The present specification will consider the details only of the case wherein the screen openings are square and the light source is square, e. g. an illuminated ground glass with a square apertured mask, but of course either or both may be circular or any desired shape.

In the preferred embodiment of the invention, instead of using a single source of light, a whole series of them or even two or more adjacent series may be moved so as to project superimposed screen shadows on the film. In this case a regular pattern is obtained by having the separation of the centers of the light sources equal to the screen interval multiplied by the ratio of their respective distances from the film. Thus the light from one of the light sources through one screen opening strikes the film at exactly the same point as light from an adjacent source through an adjacent screen opening. Since the diameter of the light source has a projected length equal to the width of the dark portion of the screen, the dark portion between the light sources must have a projected length equal to the width of each screen opening (in the regular case).

If the series of light sources is made continuous as for instance on a disk or endless ribbon, the halftone image can be printed continuously. Obviously, this is the most preferred embodiment of my invention.

The invention, its objects and advantages will be more fully understood from the following description when read in connection with the accompanying drawings in which.

Figure 6A:

Figs. 6A, B, C, D, E, and F illustrate the distribution of density over various forms of dot or halftone formations.

Figure 1:
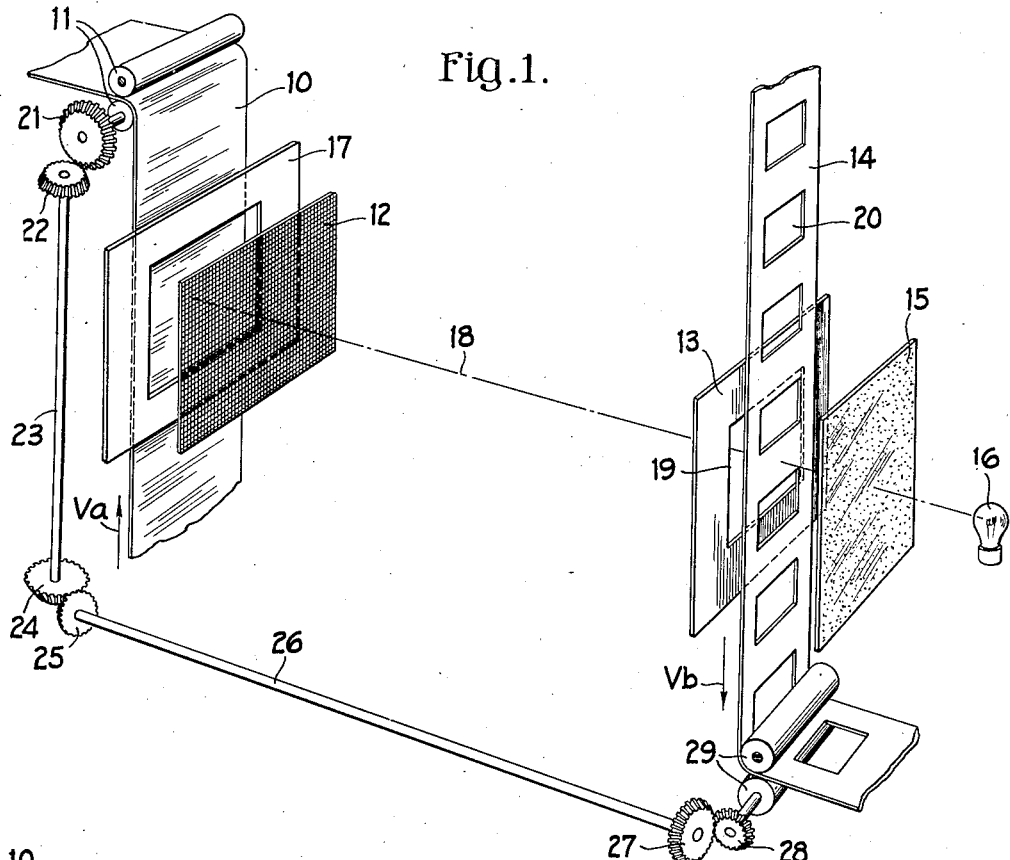
Fig. 1 is a perspective view of one embodiment of the invention.
Figure 2:
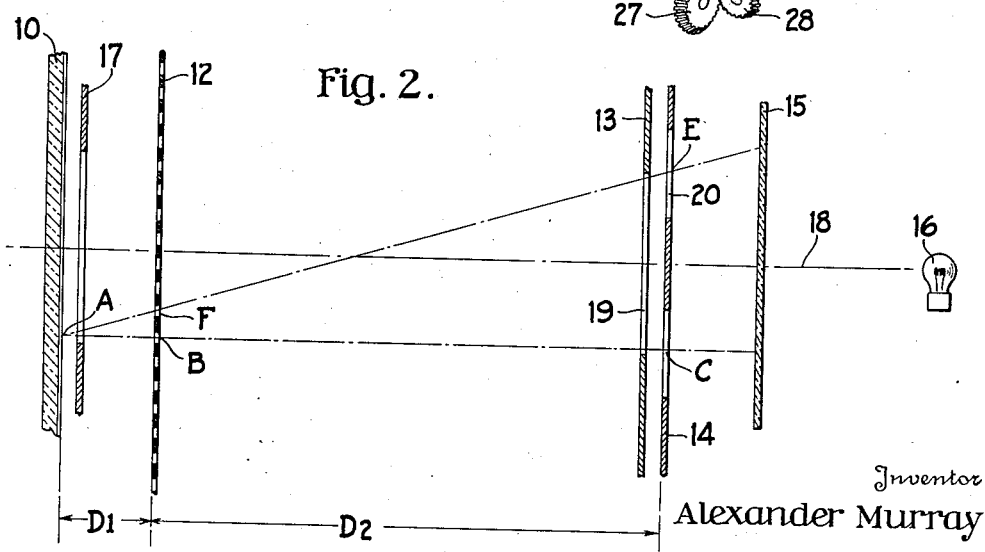
Fig. 2 is a vertical cross section of the arrangement shown in Fig. 1.

In Figs. 1 and 2 a photographic film 10 is exposed through a screen 12 positioned a distance $D_1$ in front thereof, by a series of light sources. This series is formed by apertures 20 in a band 14 which apertures are illuminated by a ground glass or other diffusing medium 15 in front of a primary light source 16. The optic axis of the system is indicated by the broken line 18. Any suitable series of light sources may be used and since any point in a light beam may be considered as a source, the apertures 20 themselves are spoken of as "light sources." As shown, the film 10 is exposed directly, but in that embodiment of the invention wherein a latent halftone image is placed on the base side of the emulsion the film 10 may be reversed so as to be exposed through the base.

According to the invention this film 10 is moved upward in its own plane by rollers 11 with a velocity $V_a$. In order that the shadow of the screen 12 will always fall on the same area of the film 10 the light sources 20 which are positioned a distance $D_2$ from the screen 12 are moved downward with a velocity $V_b$ which is equal to $$\frac{D_2}{D_1}$$

times the velocity $V_a$. These relative velocities may be provided by any suitable coupling arrangement shown as a series of bevel gears and shafts, 21, 22, 23, 24, 25, 26, and 28. In the embodiment illustrated, the light sources 20 are moved downward by rollers 29 driven by bevel gear 28.

So as to limit the exposure, masks 17 and 13 are provided respectively in front of the film and light sources. The aperture 19 in the mask 13 must have an area greater than a single light source 20; otherwise the dot formation will be incomplete. In general, the diameter of this mask opening should not however, be greater than about twice the distance between successive light sources, since otherwise some of the light passing through the screen 12 and impinging on the film 10 would be at such a great angle of incidence that there would be a difference in the diffraction effects of the screen 12.

As best seen in Fig. 2, the distance CE between successive light source centers divided by the distance AC from the light source to the film 10 should be equal to the screen interval BF of the screen 12 divided by the distance AB. This arrangement insures that the shadow pattern produced by each light source superimposes on the shadow pattern produced by every other light source. Obviously, it is not necessary to limit oneself to a single series of light sources but two or more adjacent series may be used provided they are positioned to meet the same geometrical requirements in a horizontal plane as is indicated in a vertical section in Fig. 2. If a 60 line screen is used for the screen 12, the screen interval BF is 1/60 of an inch. In the preferred embodiment of my invention, the screen 12 should be positioned a distance $D_1$ from the film 10, which distance is between 20 and 200 times the screen interval BF and the light sources 20 are positioned a distance $D_2$ from the screen 12 which distance is between 10 and 500 times $D_1$. For example, using a 60 line screen, I have found that good results can be obtained with $D_1 = .75$ inch and $D_2$ equal to 32 inches. The dimensions of the drawing are obviously exaggerated. In practice, a process camera, with or without its lens, may be used; in this case the mask 13 is the camera diaphragm and the "camera extention" is $D_1 + D_2$.

In the arrangement shown, the aperture 19 in this mask 13 has a width exactly equal to the interval between two successive sources. However, this width is not critical. Expressed in terms of $D_1$ and $D_2$, the separation of successive light source centers CE must equal $$\frac{D_1 + D_2}{D_1}$$

times BF. In the above numerical example where $D_2 = 32$ inches etc., CE equals $$\frac{32.75}{.75} \times \frac{1}{60} = .728 \text{ inch.}$$

The above description has been confined to the regular case involving no distortion of the screen pattern. However, if it is desirable to have a certain amount of distortion for any reason, there are several factors which may be varied. For example the film 10 may move in a plane not quite parallel to the screen 12. Similarly the light sources 20 may move in a plane not parallel to the screen 12. The relative velocities of the light sources 20 and the film 10 may be somewhat different from that required in the regular case. The interval between successive light sources may not have the same projected length as the screen interval BF. The diameter of each light source may not be exactly equal to the projected width of the dark portion of the screen 12. This latter variation may be introduced in one direction by having the aperture 19 in the screen 13 less than one full light source; when square light sources and a ruled screen is used, the distortion produced by having the aperture 19 round is negligible provided, of course, that this aperture 19 is sufficiently large. If a recurrent distortion is required, successive light sources may have different widths. Furthermore, it is possible to move the film and light sources in directions which are not quite diametrically opposite.

However, even in this case where a predetermined amount of distortion is introduced, useful results are obtained only when the specifications are approximately those required for the regular case. Thus in every case, the film and the light sources must move in approximately parallel planes, in approximately opposite directions and at approximately the same angular velocity with respect to the screen 12. Furthermore, the ratio of dark width to light width in the light source series must be approximately equal to the ratio of light width to dark width in the screen 12. That is, if the screen opening is a fraction F of its interval (e. g. ½) each light source must have a width approximately (1−F) times the separation of successive light source centers.

Figure 3:
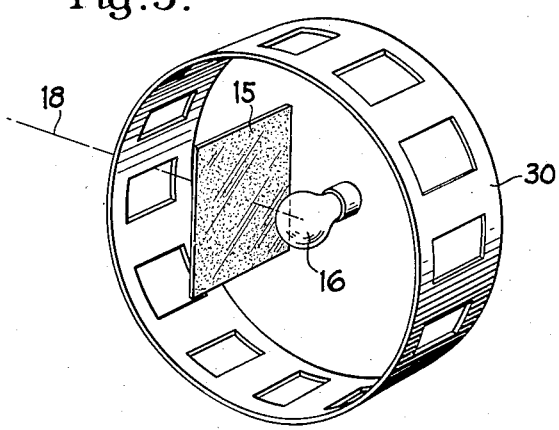
Fig. 3 illustrates one method of providing a continuous series of light sources.
Figure 4:
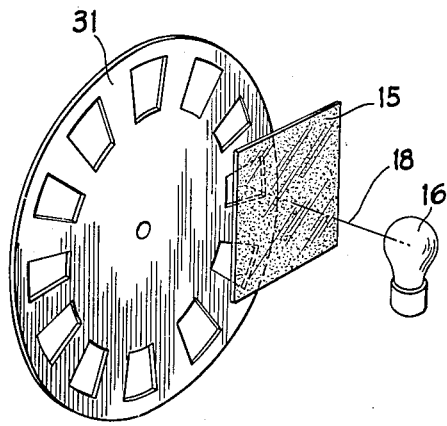
Figs. 4 and 5 illustrate other methods of providing a continuous series of light sources.
Figure 5:
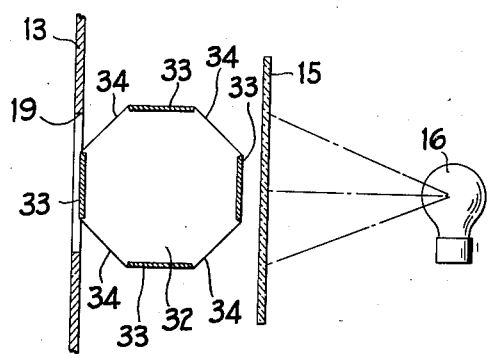

Figs. 3, 4, and 5 illustrate satisfactory methods of producing a continuous series of light sources. In Fig. 3 successive apertures are arranged on a ring 30 which is pivoted to move in front of a ground glass 15 illuminated by a lamp 16. In Fig. 4 the apertures are mounted on a disk 31. In each case suitable gearing may be provided for moving these apertures in accordance with the film movement.

In Fig. 5 the moving apertures are replaced by an optical unit comprising a rotating octagon of glass 32 with alternate spaces 33 made opaque and the other spaces 34 made diffusing. As the glass block 32 rotates in front of the ground glass 15, the light enters by one or more of the translucent surfaces 34 and the other surfaces 34 act as the successive light sources as seen through the aperture 19. As in the other cases, these light sources are geared to the film advancing mechanism by any suitable means.

The distribution of density over each element of the halftone image falling on the film, depends on the shape of the openings in the screen 12 and the shape of the light sources 20. Fig. 6A, etc. illustrates various distributions of light, forgetting the effect of diffraction. In each of these figures the height of the graph above the base line indicates the density of the dot. The distribution of light right at and behind the screen 12 is illustrated in Fig. 6F; it is well known that such a distribution is not suitable for contact screens. If the light sources 20 are small compared with those which correspond to the dark areas of the screen 12, the distribution of light at the film plane is illustrated by Fig. 6D. If the light sources are too large, there will be an overlapping of the dot formations as shown in Fig. 6E.

If the relative areas of the light source and the screen openings are correct, the distribution on the film 10 as shown in Fig. 1, will have that illustrated by Fig. 6A.

Figure 6B:
Figure 6C:
Figure 6D:
Figure 6E:
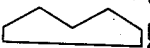
Figure 6F:

On the other hand, if the light sources are circular in cross section and a screen with square openings is used, the light distribution will be something similar to that shown in Fig. 6B, whereas if a screen having round openings is used with square light sources the distribution will be somewhat along the lines shown in Fig. 6C. Obviously, it is possible to control this distribution of density in the dot formation so as to compensate for the characteristics of the photographic material used and to eliminate the effects of the toe of the characteristic curve of the emulsion.

Having thus described one embodiment of my invention, I wish to point out that it is not limited to the specific arrangement shown but is of the scope of the appended claims.

What I claim and desire to secure by Letters Patent of the United States is:

1. The method of printing a halftone image on a sensitive film which comprises moving the film continuously in one direction in an image plane positioned a distance $D_1$ behind a halftone screen and moving a light source in the opposite direction in a plane positioned in front of said halftone screen a distance $D_2$ at a speed approximately equal to $$\frac{D_2}{D_1}$$

times the speed of the film.

2. The method according to claim 1 in which the light source has a diameter approximately $$\frac{D_2+D_1}{D_1}$$

times the width of a dark element of the screen.

3. The method of printing a halftone image on a sensitive film which comprises moving the film in one direction in an image plane positioned a distance $D_1$ behind a halftone screen and moving a continuous series of light sources in the opposite direction in a plane positioned a distance $D_2$ in front of the screen at a velocity approximately equal to $$\frac{D_2}{D_1}$$

times the velocity of the film.

4. The method according to claim 3 in which each light source has a diameter approximately $$\frac{D_2+D_1}{D_1}$$

times the width of a dark element of the screen and the centers of adjacent sources are separated approximately $$\frac{D_2+D_1}{D_1}$$

times the screen interval.

5. The method according to claim 3 in which $D_1$ is between 20 and 200 times the screen interval and $D_2$ is between 10 and 500 times $D_1$.

6. A device for exposing sensitive film to a halftone image comprising a halftone screen whose opening width is a fraction F of its interval, said screen being positioned approximately parallel to the film and a distance $D_1$ therefrom, a series of light sources positioned approximately parallel to the film and the screen a distance $D_2$ in front of the screen, the light sources having approximately the same width with their centers separated by intervals approximately $$\frac{D_2+D_1}{D_1}$$

times the interval of said screen and the width of each source being approximately (1−F) times the separation of said centers and means for moving the film and light sources in opposite directions in their respective planes with velocities such that the velocity of the light sources is $$\frac{D_2}{D_1}$$

times the velocity of the film.

7. A device according to claim 6 in which $D_1$ is between 20 and 200 times the screen interval and $D_2$ is between 10 and 500 times $D_1$.

8. A device according to claim 6 in which the light sources are apertures in a mask moving in front of an extended source of light.

9. A device according to claim 8 in which there is an apertured mask near the film between it and the screen and another apertured mask near the light sources between them and the screen, the width of the aperture in the mask near the light source being greater than the width of one source and less than twice the interval between successive light source centers.

ALEXANDER MURRAY.